United States Patent
Cai et al.

(10) Patent No.: US 8,990,917 B2
(45) Date of Patent: Mar. 24, 2015

(54) AUTHENTICATION OF APPLICATIONS THAT ACCESS WEB SERVICES

(71) Applicants: Yigang Cai, Naperville, IL (US); Alok Sharma, Lisle, IL (US)

(72) Inventors: Yigang Cai, Naperville, IL (US); Alok Sharma, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 61 days.

(21) Appl. No.: 13/728,653

(22) Filed: Dec. 27, 2012

(65) Prior Publication Data

US 2014/0189845 A1 Jul. 3, 2014

(51) Int. Cl.
- *G06F 21/00* (2013.01)
- *H04L 29/06* (2006.01)
- *H04L 29/08* (2006.01)
- *G06F 9/00* (2006.01)

(52) U.S. Cl.
CPC ........ *H04L 63/0281* (2013.01); *H04L 63/0245* (2013.01); *H04L 67/02* (2013.01); *H04L 67/2823* (2013.01); *H04L 67/2819* (2013.01); *G06F 9/00* (2013.01); *H04L 69/08* (2013.01)
USPC ........................ 726/12; 726/2; 726/3; 726/11

(58) Field of Classification Search
USPC ............................................. 726/2, 3, 11–12
See application file for complete search history.

(56) References Cited

U.S. PATENT DOCUMENTS

| | | | |
|---|---|---|---|
| 2010/0306547 A1* | 12/2010 | Fallows et al. | 713/178 |
| 2011/0173108 A1* | 7/2011 | Rajasekar et al. | 705/34 |

* cited by examiner

*Primary Examiner* — Ghazal Shehni
(74) *Attorney, Agent, or Firm* — Duft Bornsen & Fettig, LLP

(57) ABSTRACT

Systems and methods for authenticating applications that access web services. In one embodiment, a web service gateway intercepts a request for a web service from an application, and determines if the application is authorized by a service provider based on information provided in the web service request. If the application is authorized, then the web service gateway identifies a profile for an end user that initiated the web service using the application, and determines if the web service is allowed for the end user based on the profile. If the web service is allowed for the end user, then the web service gateway determines that the application is authenticated, converts the web service request to a protocol used by a server that provides the web service, and transmits the web service request to the server.

20 Claims, 6 Drawing Sheets

AUTHENTICATION OF APPLICATIONS THAT ACCESS WEB SERVICES

FIELD OF THE INVENTION

The invention is related to the field of communications and, in particular, to applications that access web services.

BACKGROUND

Web services are becoming very popular as more and more web sites and applications are available to consumers. Some examples of web services are Facebook, Google Voice, Twitter, etc. When an end user wants to access a web service, the end user downloads or installs an application for the web service on his/her device. An application that is loaded on an end user device is commonly referred to as a "mobile app" or a "phone app". When the end user runs the application on his/her device, the application will generate a web service request and send the web service request to a server that is able to provide the web service. The web service request is typically sent using an open Application Programming Interface (API) that is defined for web-based services. For example, the open API may be Simple Object Access Protocol (SOAP), RESTful, ParlayX, etc. The server or an intermediate gateway converts the open API request to a request in the protocol supported by the server. The server then provides the web service to the end user.

Because of the popularity of web services, service providers are continually looking for ways to improve the quality of the web services from the point of view of the consumer and the service provider.

SUMMARY

Embodiments described herein authenticate applications that are used to access web services. Because virtually any developer can write an application for accessing web services, there is a need to authenticate an application before it is given access to web services. For example, a developer may write an application for malicious purposes, and this malicious application could access web services through the open API if it is not properly authenticated. In the following embodiments, a web service gateway is used in an open API platform to interface applications for a web service with a server that provides the web service. The web service gateway converts web services requests from the open API to a protocol used in the server. The web service gateway is also used in the following embodiments to authenticate an application before the application is given access to a web service.

For instance, when a request for a web service is received from an application, the web service gateway intercepts the request and authenticates the application before sending the web service request to the server that provides the web service. The authentication process in the following embodiments is a multi-step process. One of the steps is to determine if the application is authorized (or known) to the service provider (i.e., the operator of the communication network). For example, if the application was written by a trusted developer, then the application may be authorized by the service provider. Another one of the steps is to determine if the end user, who initiated the web service through the application, is allowed to receive the web service. For example, if the web service uses SMS messaging but the end user does not subscribe to SMS messaging, then the end user is not allowed to receive the web service. A further step may be to contact the end user through an SMS message, an email, or some other means to determine if the end user actually requested the web service. After these authentication steps, if the application is authenticated then the web service gateway may allow the application access to the web service by forwarding the web service request to the server. If not, the web service gateway may block the application from accessing the web service.

By authenticating an application according to the embodiments described herein, web services can be provided to legitimate users, while avoiding threats from illegitimate users, such as spam bots and the like. Conventional web services may use login screens and other mechanisms for authenticating an end user. But, conventional web services are not able to effectively authenticate the application itself that is generating the web service requests. The web service gateway described herein is able to stop applications from accessing web services (i.e., sending web service requests) until the application is properly authenticated to the gateway.

One embodiment comprises a web service gateway that is implemented in a network of a service provider between an application for a web service and a server that provides the web service. The web service gateway is configured to intercept a request for the web service from the application, and to determine if the application is authorized by the service provider based on information provided in the web service request. If the application is authorized by the service provider, then the web service gateway is further configured to identify a profile for an end user that initiated the web service using the application, and to determine if the web service is allowed for the end user based on the profile. If the web service is allowed for the end user, then the web service gateway is further configured to determine that the application is authenticated, to convert the web service request to a protocol used by the server that provides the web service, and to transmit the web service request to the server.

In another embodiment, if the application is not authorized by the service provider, then the web service gateway is further configured to deny the request for the web service, and to generate a security patch based on information regarding the request for the web service.

In another embodiment, the web service gateway is further configured to locate an application identifier in the web service request that is assigned to the application, and to compare the application identifier to a white list of applications to determine if the application is authorized.

In another embodiment, the web service gateway is further configured locate a partner identifier in the web service request that is assigned to an entity that developed the application, and to compare the partner identifier to a whitelist of partners to determine if the application is authorized.

In another embodiment, the web service gateway is further configured locate a campaign identifier in the web service request, and to process the campaign identifier to select policies for determining whether the application is authorized.

In another embodiment, the web service gateway is further configured to process the profile for the end user to identify an alternate method of communicating with the end user other than through the application, and to send a query to the end user through the alternate method of communication to verify that the end user requested the web service. One alternate method of communicating with the end user may be a text message.

In another embodiment, the web service gateway is further configured to receive a response from the end user verifying the end user's desire for the web service, and to send the request to the server that provides the web service after receiving the response from the end user.

In another embodiment, the web service gateway is further configured to locate context information stored for the end user, to process the profile for the end user to determine a subset of the context information that is authorized to be sent to the server for the web service, and to send the subset of the context information to the server.

In another embodiment, the web service gateway is further configured to send a query to the end user to determine the subset of the context information that is authorized to be sent to the server.

Another embodiment comprises a method of authenticating an application for a web service. The method includes intercepting a request for a web service in a web service gateway from an application, and determining if the application is authorized by a service provider based on information provided in the web service request. If the application is authorized by the service provider, then the method includes identifying a profile for an end user that initiated the web service using the application, and determining if the web service is allowed for the end user based on the profile. If the web service is allowed for the end user, then the method includes determining that the application is authenticated, converting the web service request to a protocol used by a server that provides the web service, and transmitting the web service request to the server.

In another embodiment, if the application is not authorized, then the method includes denying the request for the web service, and generating a security patch based on information regarding the request for the web service.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
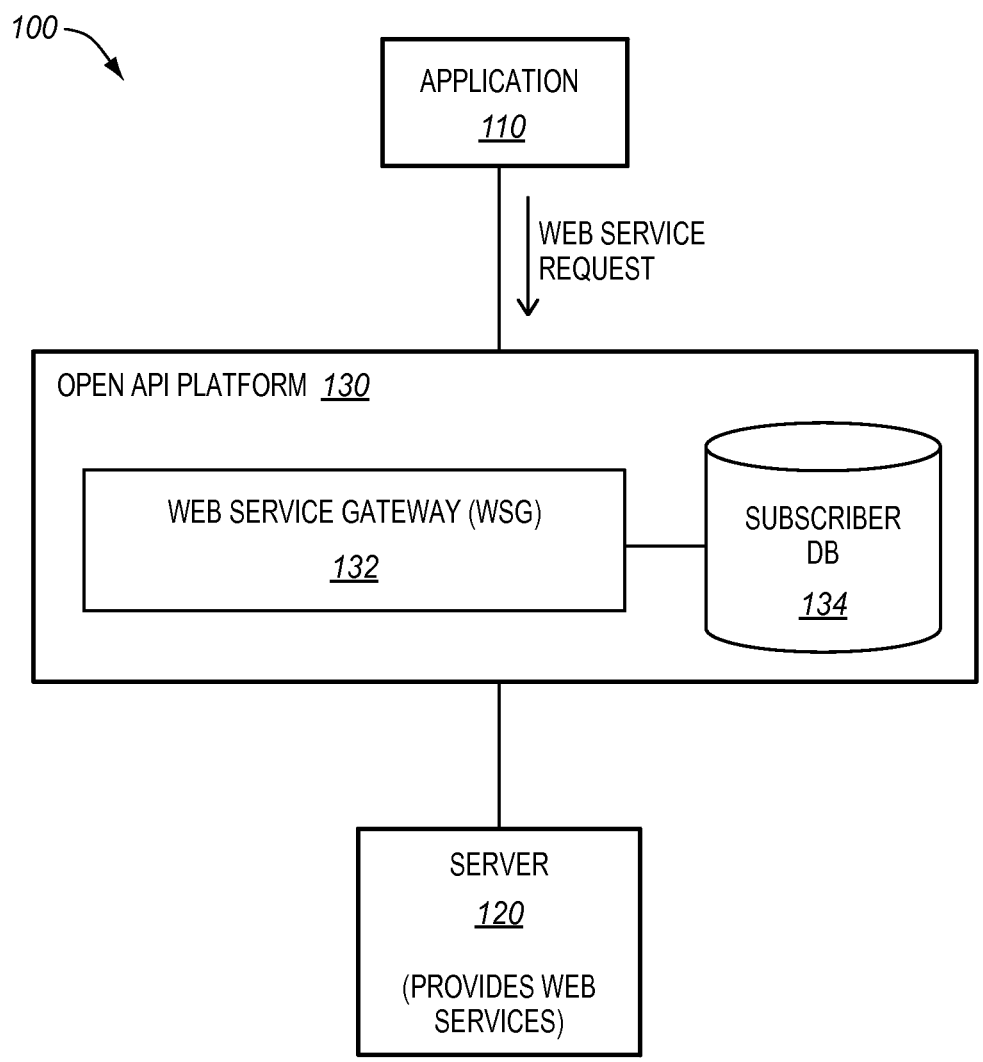
FIG. 1 illustrates a communication system in an exemplary embodiment.

FIG. 1 illustrates a communication system 100 in an exemplary embodiment. Communication system 100 includes an application 110 that is able to access one or more web services. Examples of web services are Facebook, Twitter, Google Voice, enterprise services, etc. Application 110 may comprise a mobile application that is executing on a mobile device, such as a phone. Application 110 may also comprise a browser-based application that is executable through a browser running on a PC. The web service in this embodiment is provided by a server 120. Server 120 comprises any system or device in a network that provides a function or functions for a web service. For example, if the web service requests a voice call, then server 120 may comprise a switch or Call Session Control Function (CSCF) that manages the voice call. Those skilled in the art will appreciate that multiple elements (or servers) of a network may commit resources to provide a function for a web service. The network elements may be for a packet-switched network, such as the internet, an enterprise network, the World Wide Web, etc, or for a telecommunication (telecom) network, such as an IP Multimedia Subsystem (IMS) network, a Long Term Evolution (LTE) network, etc.

In this embodiment, an open Application Programming Interface (API) platform 130 is implemented by a service provider between application 110 and server 120. An open API platform 130 is comprised of devices that are able to convert between standardized commands from web-based applications (e.g., application 110) to a protocol used by server 120 or other servers not shown. In this embodiment, open API platform 130 includes a web service gateway (WSG) 132 and a subscriber database 134. Web service gateway 132 comprises any system, server, or device that interfaces a web-based application with other network elements, such as a server that provides a web service. Web service gateway 132 is able to receive web service requests from a web-based application that are formatted according to an open API, such as RESTful, SOAP, Parlay X, etc. Web service gateway 132 is also able to convert the web service requests into protocols that are used by servers that provide the web service. For example, web service gateway 132 may convert a RESTful request into Session Initiation Protocol (SIP) request for a service provided by an IMS network.

Subscriber database 134 comprises any system that is able to store information (also referred to as subscriber data) regarding end users that access web services. The information stored for end users may include a subscriber profile indicating the services subscribed to by the end user. The information stored for end users may also include context information, such as a subscriber name, language preference, home address, home time zone, billing address, email address, telephone number(s), device information, data connection (e.g., GPRS, EDGE, UMTS, LTE), contact method preferences (e.g., SMS, MMS, email, etc), etc. Subscriber database 134 is able to retrieve information from various network elements to keep the context information up-to-date.

The open API platform 130 in the following embodiments "intercepts" web service requests from an application before they are sent to the server that provides the web service. The open API platform 130 makes sure that the application is authenticated before allowing the application access to the web service. For example, the open API platform 130 may determine whether the application is known and/or trusted by the service provider, whether the partner that developed the application is known and/or trusted by the service provider, whether the end user that requested that web service is known and/or trusted by the service provider, etc. The open API platform 130 may then perform further verification steps to ensure that the application is being initiated by a legitimate end user for a legitimate purpose. After the application is properly authenticated, the open API platform 130 may allow the application to access the web service by forwarding web service requests from the application to the proper server.

Assume for this embodiment that an end user selects application 110 to initiate a web service. When this occurs, application 110 generates a request for the web service according to the open API. Application 110 then sends the web service request toward the server that provides the web service. Web service gateway 132 may then operate as described in FIG. 2.

Figure 2:
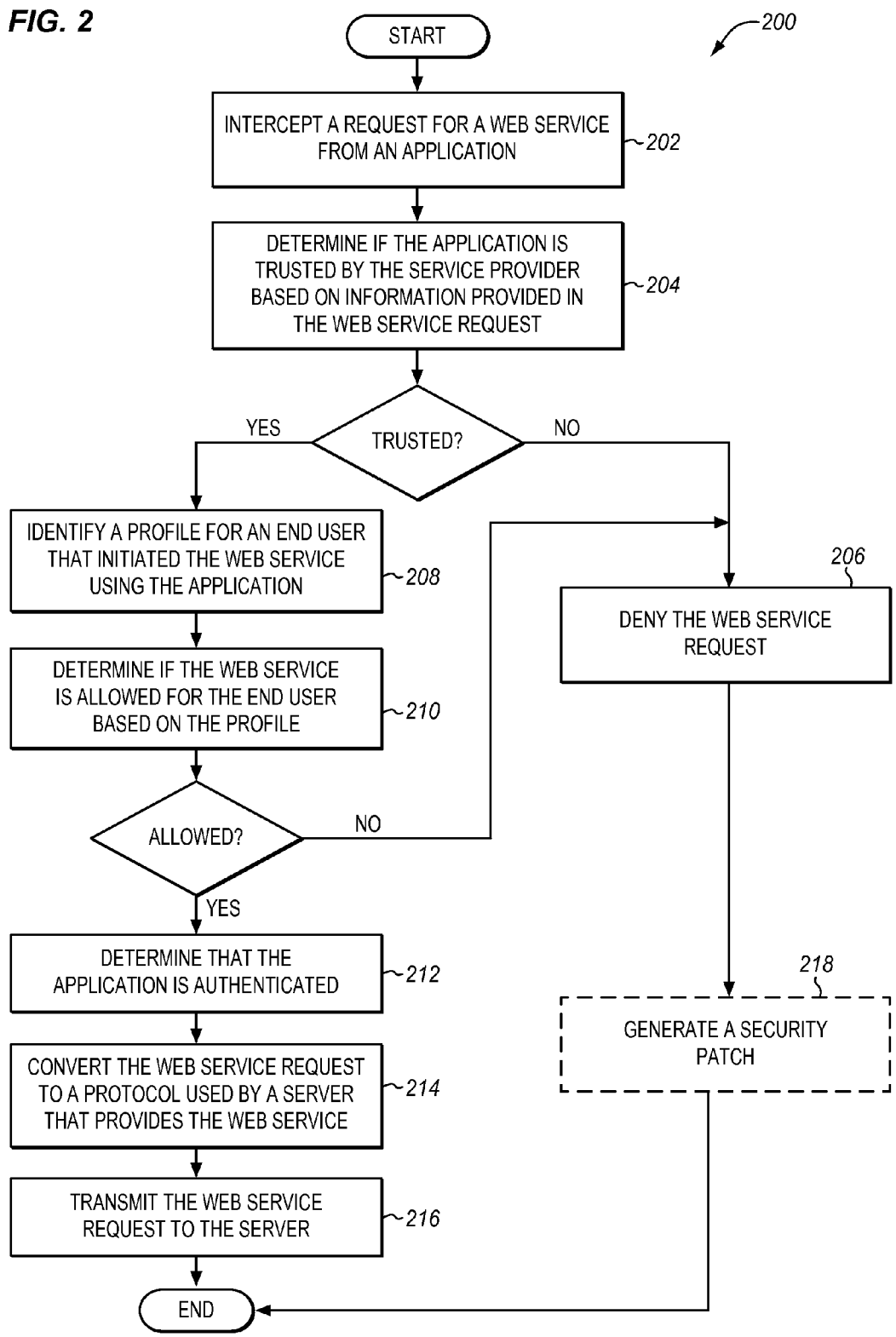
FIG. 2 is a flow chart illustrating a method of authenticating an application in an exemplary embodiment.

FIG. 2 is a flow chart illustrating a method 200 of authenticating an application in an exemplary embodiment. The steps of method 200 will be described with reference to web service gateway 132 in FIG. 1, but those skilled in the art will appreciate that methods described herein may be performed in other systems. The steps of the flow charts described herein are not all inclusive and may include other steps not shown. The steps may also be performed in an alternative order.

In step 202, web service gateway 132 intercepts the web service request from application 110. Web service gateway 132 is able to intercept the web service request before it is ever sent to a server that provides the web service. In step 204, web service gateway 132 determines if application 110 is authorized by the service provider to provide the web service based on information provided in the web service request. Web service gateway 132 may determine that application 110 is authorized by the service provider based on information about the application itself, based on information regarding the partner (i.e., the developer) of the application, based on information regarding the entity or device that is executing the application, etc.

As an example of determining whether application 110 is authorized, web service gateway 132 may process one or more headers of the web service request to identify information inserted by application 110. The information from the headers may include an application identifier (ID), a partner ID, and/or a campaign ID among other data. An application ID is an identifier that is assigned to the application when it is developed or deployed. For example, an application for generating mobile boarding passes for United Airlines may be given a unique application ID when it is developed. A partner ID is an identifier that is assigned to an organization, person, or other entity that develops the application. For example, United Airlines may be given a unique partner ID for developing applications for use with the service provider. A campaign ID is an identifier that indicates a campaign that will use the open API for web services. A campaign is a definition or profile of how an application is to behave in providing web services. The campaign defines that the application should provide a certain set of functionalities for a certain amount of time to a certain set of subscribers. A campaign is targeted to a specific subscriber group, such as prepaid, postpaid, SMS, voice, conference calls, etc. Only those subscribers in the group can access that campaign. When an end user device executes an application, the application will insert the campaign ID in the API request for authentication.

As an example, for a SOAP web service scenario, the partner ID, application ID, and campaign ID may be carried in the Username block defined by WS-S in the SOAP header. The SOAP header may look as follows:

```
<soapenv:Header>
    <wsse:Security xmlns:wsse="http://docs.oasis-open.org/
wss/2004/01/oasis-200401-wss-wssecurity-secext-1.0.xsd">
        <wsse:UsernameToken xmlns:wsu="http:/docs.oasis-
open.org/wss/2004/01/oasis-200401-wss-wssecurity-utility-1.0.xsd"
wsu:d="UsernameToken-17308974">
            <wsse:Username>partnerid:appid:campaignid</wsse:Username>
            <wsse:Password Type="http://docs.oasis-open.org/wss/2004/01/
oasis-200401-wss-username-token-profile-1.0#PasswordText">
17B27E08D5E23871614FA99E33BFBB20</wsse:Password>
        </wsse:UsernameToken>
    </wsse:Security>
</soapenv:Header>\
```

Web service gateway 132 may use one or more of these IDs to identify policies for determining if the application is authorized. Web service gateway 132 may distinguish between trusted and untrusted applications when determining the authorization policies. For instance, web service gateway 132 may compare a source IP address against a whitelist of IP addresses. If the source IP is in the whitelist, then the application is from a trusted partner and is given one set of authorization policies. If the source IP is not in the whitelist, then the application is from an untrusted partner and is given another set of authorization policies.

Web service gateway 132 has the ability to manage different authorization policies for trusted and non-trusted requests. For example, an authorization policy may be based on parameters including an account status, a customer type, a service level, a priority level, feature selected by a user, etc. Web service gateway 132 may use the campaign ID, partner ID, and/or application ID to identify the proper policies for authorization. The following Table is an example of how web service gateway 132 may determine authorization policies for an application.

TABLE 1

| Partner | Non-Trusted | Trusted | Authorization Policy |
|---|---|---|---|
| Campaign ID | YES | YES | Allow Rule for API (disallow everything else) (sdcsAccountStatus = active) AND (sdcsCustomerType = 1 OR 2) AND (sdcsFeature = PS6) AND (sdcsBlackListAll = FALSE) AND (sdcsServiceLevel = ANY) |
| App ID | YES | YES | Allow Rule for API (disallow everything else) (sdcsAccountStatus = active) AND (sdcsCustomerType = 1) AND (sdcsFeature = MY5 OR CTNCTRL OR KIDCONNECT) AND (sdcsBlackListAll = FALSE) AND (sdcsServiceLevel >= 3) |
| Any other ID | YES | | Disallow Rule for API (allow everything else) sdcsBlackListALL = TRUE |

If web service gateway 132 determines that application 110 is not authorized, then web service gateway 132 may deny the web service request in step 206. Web service gateway 132 may also send a response or notification to application 110 (see FIG. 1) indicating that the web service was not allowed and possibly indicating the reasons why the web service was not allowed.

If web service gateway 132 determines that application 110 is authorized by the service provider, then web service gateway 132 may perform another level of authentication for application 110. Web service gateway 132 determines whether the requested web service is allowed for the end user. To do so, web service gateway 132 identifies a profile for the end user that initiated the web service in step 208. Web service gateway 132 may retrieve the profile from subscriber database 134. The profile indicates what services are allowed based on the subscriptions of the end user. For example, the profile may indicate that voice calls are allowed for the end user, but SMS messages are not allowed. Web service gateway 132 then determines if the web service is allowed for the end user based on the profile in step 210. If the web service is not allowed, then web service gateway 132 may deny the web service request in step 206. If the web service is allowed based on the profile, then web service gateway 132 determines that the application is authenticated in step 212. When the application is authenticated, web service gateway 132 converts the service request from the open API to a protocol used by server 120 that provides the web service in step 214. After conversion, web service gateway 132 transmits the web service request to server 120 in step 216.

If the web service request is denied in method 200, then web service gateway 132 may (optionally) generate a security patch to stop future use of application 110 in step 218. Web service gateway 132 may generate the security patch by delivering key security features such as protection of sensitive data, health-check, off hour patches, etc.

Figure 3:
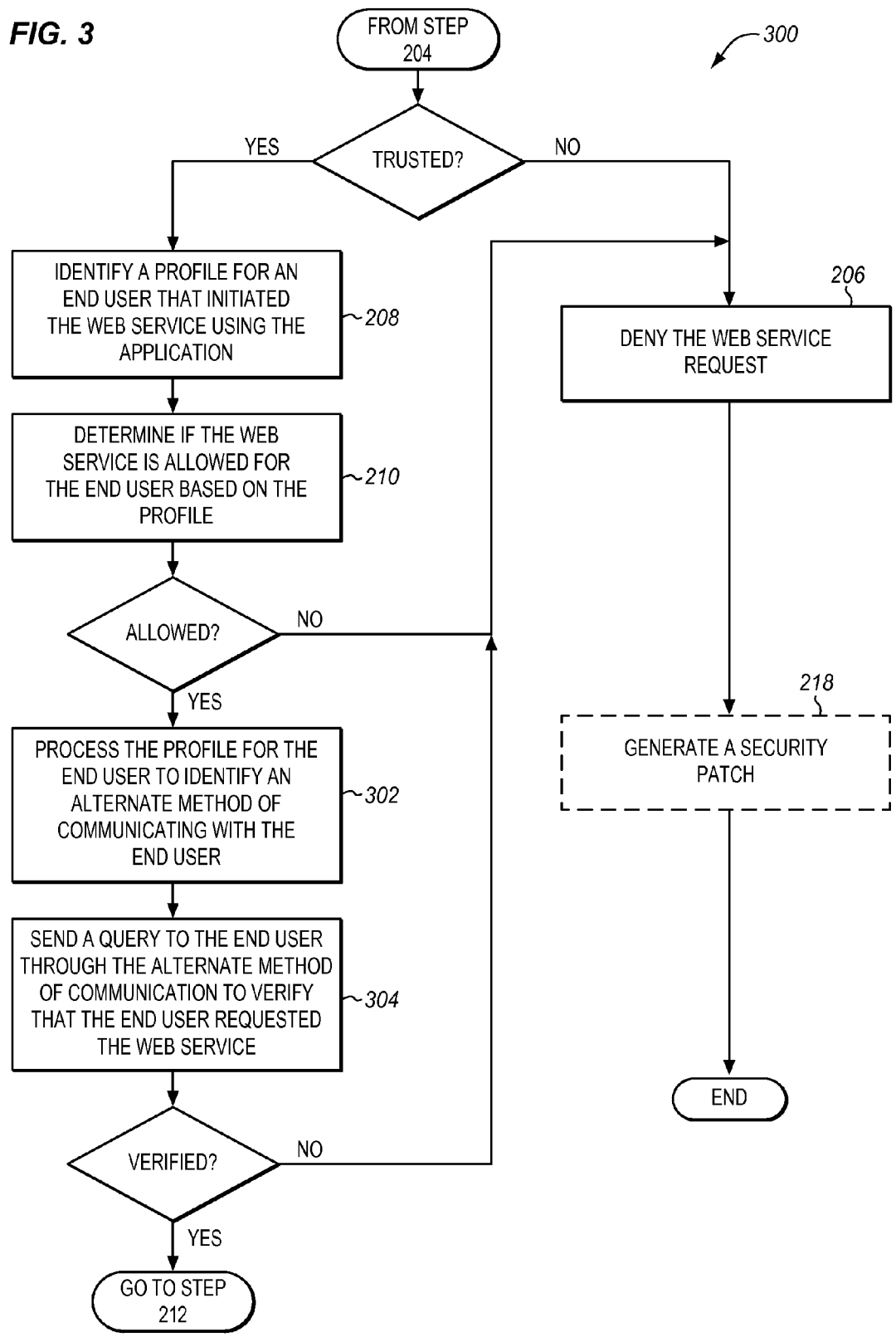
FIG. 3 illustrates further steps of a method of authenticating an application in an exemplary embodiment.

Web service gateway 132 may perform further authentication steps before sending the web service request to server 120. FIG. 3 illustrates further steps of authenticating application 110 in an exemplary embodiment. According to FIG. 3, before sending the web service request to server 120, web service gateway 132 may contact the end user, which is accessing application 110, to determine if the end user requested the web service. To do so, web service gateway 132 processes the profile for the end user to identify an alternate method of communicating with the end user in step 302. An alternate method of communication is a means of communicating with the end user other than through application 110. Some examples of alternate methods of communication include voice, SMS, MMS, email, etc. Web service gateway 132 then sends a query to the end user through the alternate communication method to verify that the end user requested the web service in step 304. If the end user responds affirmatively, then web service gateway 132 is able to verify that the end user requested the web service. This further indicates that the application is authenticated. Thus, web service gateway 132 sends the web service request to server 120 as shown in steps 214-216 of FIG. 2. If web service gateway 132 receives no response from the end user or receives a negative response, then web service gateway 132 determines that the end user did not request the web service. Web service gateway 132 may then deny the web service request in step 206.

Web service gateway 132 advantageously authenticates an application before the application gains access to servers that provide web services. Therefore, the servers are protected against spam or other threats. There may be additional mechanisms used to protect the servers against threats from "spam bots" or other malicious applications, but web service gateway 132 provides an additional layer of protection at the API level.

Some web services benefit from context information about the end user. For example, if a web service involves a customer service agent, it may be beneficial to provide context information (e.g., name, address, language preference, etc.) to the customer service agent so that the agent can more effectively serve the end user. In addition to authenticating an application that accesses a web service, the open API platform described herein is able control what context information is provided to a server for a web service. As described above, the open API platform 130 includes a subscriber database 134 that stores and manages context information for end users. If server 120, that is providing the web service, requests context information for the end user, then web service gateway 132 may operate as described in FIG. 4 to control what context information is provided to server 120.

Figure 4:
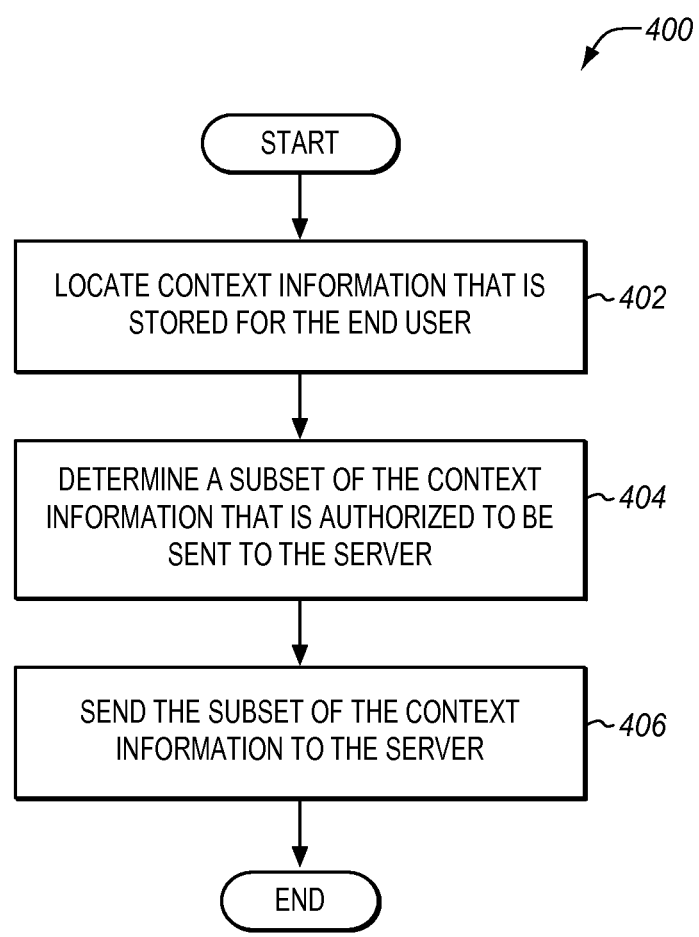
FIG. 4 is a flow chart illustrating a method of controlling context information for an end user in an exemplary embodiment.

FIG. 4 is a flow chart illustrating a method 400 of controlling context information for an end user in an exemplary embodiment. Assume for method 400 that server 120 requests context information for a web service, or that application 110 requests context information be provided to server 120. In step 402, web service gateway 132 locates context information that is stored for the end user, such as in subscriber database 134. In step 404, web service gateway 132 determines a subset of the context information that is authorized to be sent to server 120 for the web service. The subset of context information may depend on the web service that is being provided. For example, the end user may define what context information is allowed in his/her profile through policy rules. Thus, web service gateway 132 may process the policy rules in the profile for the end user to determine what context information is allowed to be sent to server 120.

Also, web service gateway 132 may query the end user (e.g., in real-time) to determine what context information is allowed to be sent to server 120. Assume for example that the web service involves a voice call. Web service gateway 132 is able to query the end user during the call to determine what information to send to server 120. Web service gateway 132 may execute voice prompts, collect user input using Automatic Speech Recognition (ASR) and DTMF tones, record voice utterances, etc. To ensure that the end user is actually the subscriber of the web service, web service gateway 132 may use voice analysis or biometrics to verify that users are who they claim to be.

In step 406, web service gateway 132 sends the subset of the context information to server 120. Server 120 may then use the authorized context information as part of the web service. For example, server 120 may populate a screen of a customer service agent with the authorized context information so that the agent can better assist the end user.

Example

Figure 5:
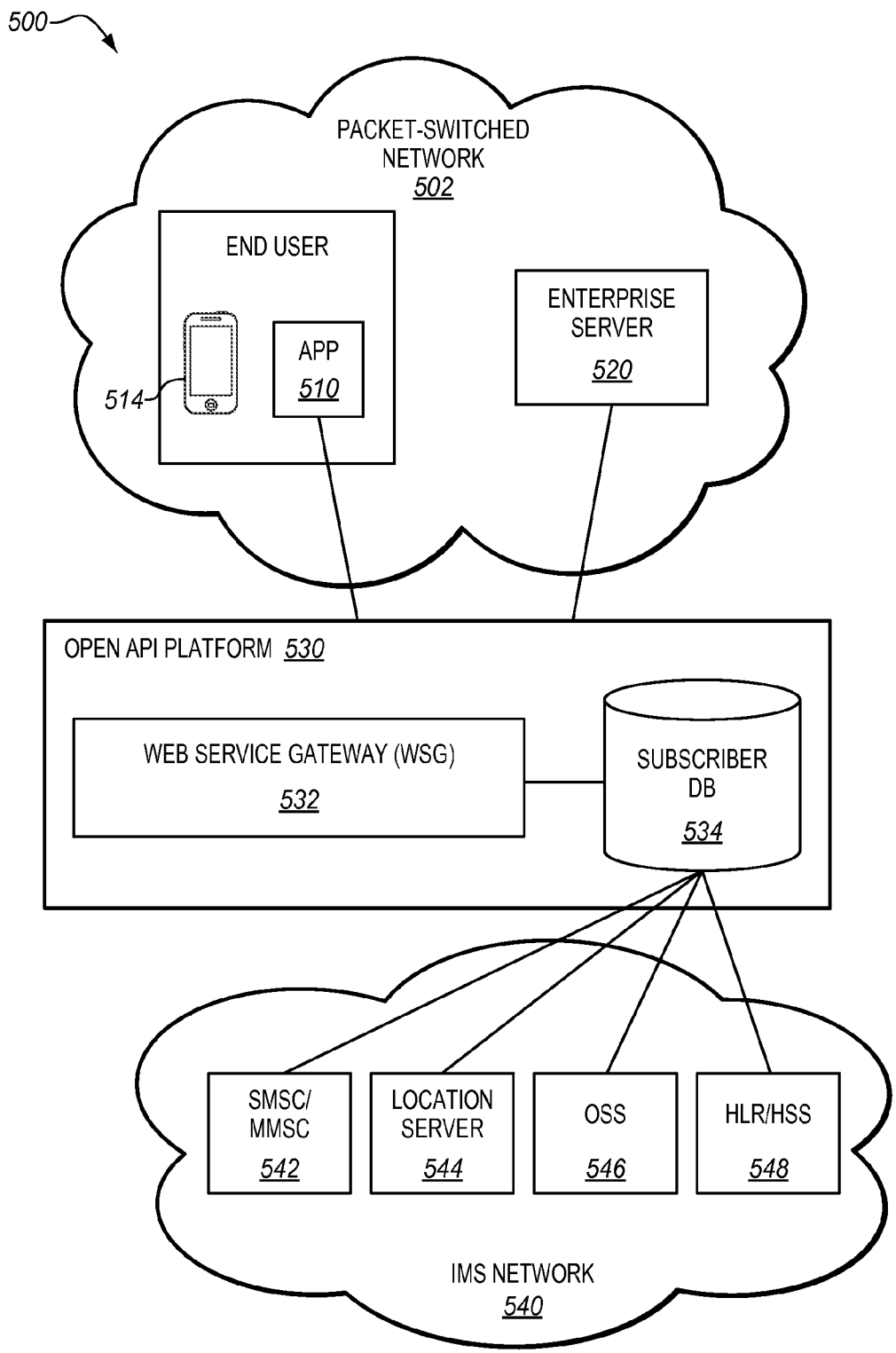
FIG. 5 illustrates a communication system in another exemplary embodiment.

FIG. 5 illustrates a communication system 500 in another exemplary embodiment. Communication system 500 includes an open API platform 530 implemented in a packet-switched network 502, such as the internet. One example of Open API platform 530 is an Application Exposure Suite (AES) provided by Alcatel-Lucent. Open API platform 530 is installed by a service provider to act as an interface between an application 510 and an enterprise server 520 that provides a web service. One assumption for this example is that the web service includes a voice call provided through application 510.

Application 510 may run on a mobile phone, a computer, a tablet PC, or any other device of an end user. The end user (or subscriber) opens or otherwise activates application 510 to access the desired web service. Open API platform 530 includes a web service gateway (WSG) 532 and a subscriber database 534. Subscriber database 534 is able to store and manage context information for the end user. Open API platform 530 is also shown as being connected to a telecommunication network, such as IMS network 540. IMS network 540 stores a variety of information regarding the end user. In this example, IMS network 540 includes an SMSC/MMSC 542, a location server 544, an Operations Support System (OSS) 546, and a Home Location Register (HLR)/Home Subscriber Server (HSS) 548. Each of these elements of IMS network 540 is able to store information regarding the end user. Therefore, subscriber database 534 communicates with these network elements to retrieve and store context information for the end user. Although not specifically shown in FIG. 5, WSG 532 may represent a Service Capability Feature (SCF) module of the AES that includes application enablers.

Figure 6:
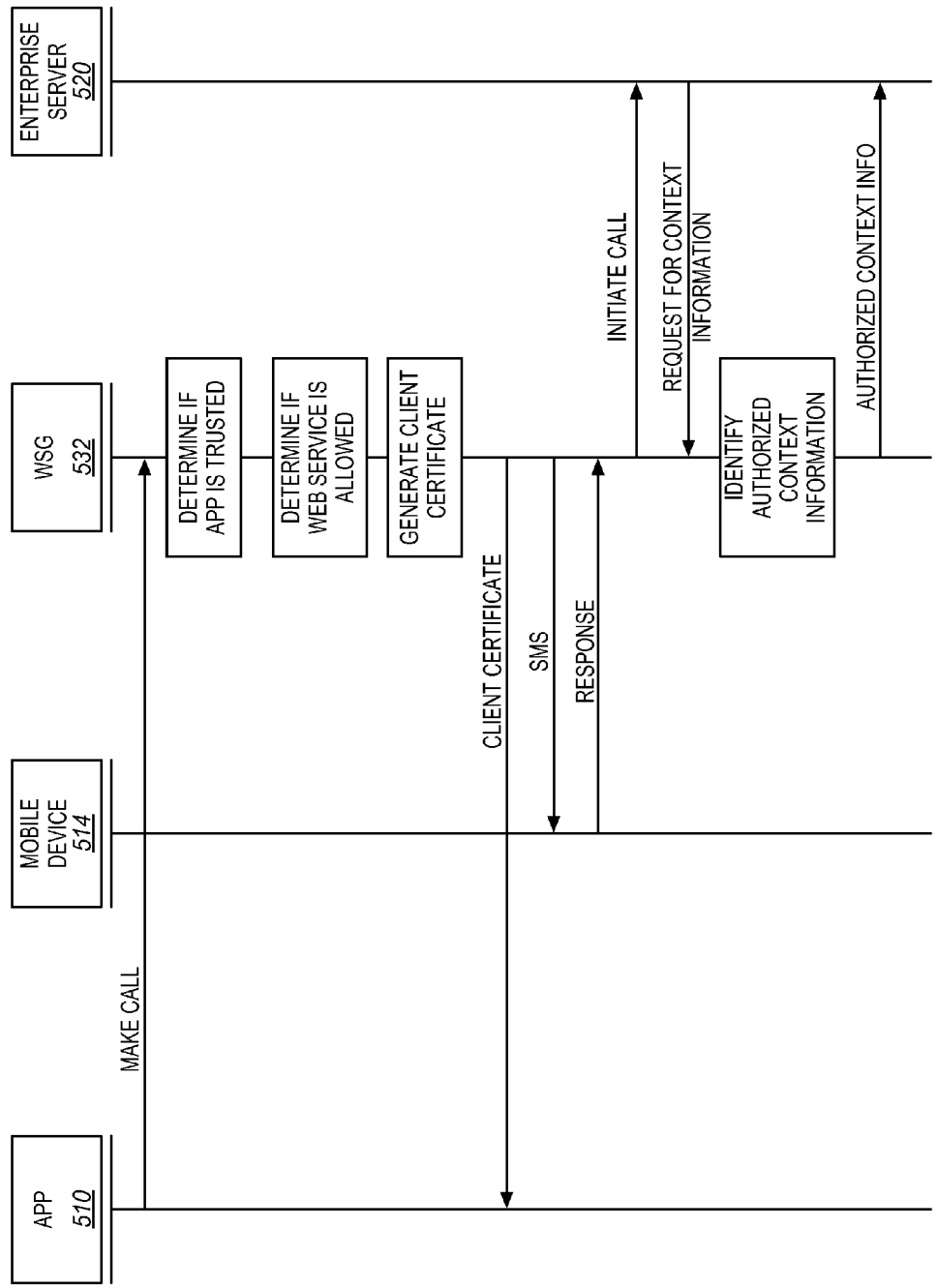
FIG. 6 is a message diagram illustrating a web service in an exemplary embodiment.

FIG. 6 is a message diagram illustrating a web service in an exemplary embodiment. Assume for this example that an end user selects application 510 to initiate a web service to call enterprise server 520. When this occurs, application 510 generates a web service request according to an open API. The web service request in this example is referred to "makeCall". Application 510 then sends the web service request to web service gateway 532.

Upon receiving the web service request, web service gateway 532 processes the headers of the web service request to determine if application 510 is trusted by the service provider. To do so, web service gateway 532 identifies an application ID, a partner ID, and a campaign ID from the web service request. Based on one or more of the application ID, a partner ID, and a campaign ID, web service gateway 532 selects policies for authorizing application 510. Web service gateway 532 then determines if application 510 is authorized based on the authorization policies.

If web service gateway 532 determines that application 510 is authorized, then web service gateway 532 performs a second level of authentication by determining if the web service is allowed for this end user. Web service gateway 532 decodes the Base64 "ClientID" and "Password" from the web service request. Web service gateway 532 then performs the second level of authentication based on variable parameters, such as context, communication, content, and control. One of the authentication parameters is to determine if the requested service is allowed for this end user. Thus, web service gateway 532 processes a profile for the end user to determine if voice calls are allowed to enterprise server 520. If the web service is allowed for the end user, then web service gateway 532 generates a client certificate and sends the certificate to application 510. Web service gateway 532 also contacts the end user (or a communication device of the end user) to determine if the end user requested the web service. To do so, web service gateway 532 processes the profile for the end user to identify an alternate method of communicating with the end user. In this example, assume that the alternate method of communication is an SMS message. Web service gateway 132 then sends an SMS message to a mobile device 514 of the end user as a query to verify that the end user requested the web service. The end user may actively respond to the SMS message or mobile device 514 of the end user may automatically respond to the SMS message. In this example, it is assumed that web service gateway 532 receives a confirmation back from the end user verifying that the end user requested the web service. Thus, web service gateway 532 converts the web service request from the open API to a protocol used by enterprise server 520. After conversion, web service gateway 532 transmits the web service request to enterprise server 520. Enterprise server 520 may then begin to provide the web service.

As part of the web service, enterprise server 520 sends a request to web service gateway 532 for context information for the end user. In response to the request, web service gateway 532 processes policies from the profile of the end user to determine what context information is authorized to be shared with enterprise server 520. Web service gateway 532 then sends the authorized context information to enterprise server 520.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
    a web service gateway for a service provider, the web service gateway configured to interface an application for a web service with a server that provides the web service;
    wherein the web service gateway is configured to intercept a request for a web service from the application, and to determine whether the application is authorized by the service provider based on information provided in the web service request;
    wherein the web service gateway is further configured, if at least the application is authorized,
        to identify a profile for an end user that initiated the web service using the application, wherein the profile for the end user indicates what services are allowed based on subscriptions of the end user, and
        to determine if at least the web service is allowed for the end user based on the profile; and wherein the web service gateway is further configured, if at least the web service is allowed for the end user,
to determine that the application is authenticated,
to convert the web service request to a protocol used by the server that provides the web service, and
to transmit the web service request to the server.

2. The apparatus of claim 1 wherein:
the web service gateway is further configured, if at least the application is not authorized,
to deny the request for the web service, and
to generate a security patch based on information regarding the request for the web service.

3. The apparatus of claim 1 wherein:
the web service gateway is further configured to locate an application identifier in the web service request that is assigned to the application, and to compare the application identifier to a white list of applications to determine whether the application is authorized.

4. The apparatus of claim 3 wherein:
the web service gateway is further configured locate a partner identifier in the web service request that is assigned to an entity that developed the application, and to compare the partner identifier to a whitelist of partners to determine whether the application is authorized.

5. The apparatus of claim 4 wherein:
the web service gateway is further configured locate a campaign identifier in the web service request, and to process the campaign identifier to select policies for determining whether the application is authorized.

6. The apparatus of claim 1 wherein:
the web service gateway is further configured to process the profile for the end user to identify an alternate method of communicating with the end user other than through the application, and to send a query to the end user through the alternate method of communication to verify that the end user requested the web service.

7. The apparatus of claim 6 wherein:
the web service gateway is further configured to receive a response from the end user verifying the end user's desire for the web service, and to send the request to the server that provides the web service after receiving the response from the end user.

8. The apparatus of claim 6 wherein:
the alternate method of communicating with the end user comprises a text message.

9. The apparatus of claim 1 wherein:
the web service gateway is further configured to locate context information stored for the end user, to process the profile for the end user to determine a subset of the context information that is authorized to be sent to the server for the web service, and to send the subset of the context information to the server.

10. The apparatus of claim 9 wherein:
the web service gateway is further configured to send a query to the end user to determine the subset of the context information that is authorized to be sent to the server.

11. A method comprising:
intercepting a request for a web service in a web service gateway from an application, wherein the web service gateway interfaces the application for the web service with a server that provides the web service in a network of a service provider;
determining whether the application is authorized by the service provider based on information provided in the web service request;
based on at least the application being authorized:
identifying a profile for an end user that initiated the web service using the application, wherein the profile for the end user indicates what services are allowed based on subscriptions of the end user; and
determining whether the web service is allowed for the end user based on the profile;
based on at least the web service being allowed for the end user:
determining that the application is authenticated;
converting the web service request to a protocol used by the server that provides the web service; and
transmitting the web service request to the server.

12. The method of claim 11 further comprising:
based on at least the application not being authorized:
denying the request for the web service; and
generating a security patch based on information regarding the request for the web service.

13. The method of claim 11 wherein determining whether the application is authorized by the service provider based on information provided in the web service request comprises:
locating an application identifier in the web service request that is assigned to the application; and
comparing the application identifier to a white list of applications to determine whether the application is authorized.

14. The method of claim 13 wherein determining whether the application is authorized by the service provider based on information provided in the web service request further comprises:
locating a partner identifier in the web service request that is assigned to an entity that developed the application; and
comparing the partner identifier to a whitelist of partners to determine whether the application is authorized.

15. The method of claim 14 wherein determining whether the application is authorized by the service provider based on information provided in the web service request further comprises:
locating a campaign identifier in the web service request; and
processing the campaign identifier to select policies for determining whether the application is authorized.

16. The method of claim 11 further comprising:
processing the profile for the end user to identify an alternate method of communicating with the end user other than through the application; and
sending a query to the end user through the alternate method of communication to verify that the end user requested the web service.

17. The method of claim 16 further comprising:
receiving a response from the end user verifying the end user's desire for the web service; and
sending the request to the server that provides the web service after receiving the response from the end user.

18. The method of claim 16 wherein:
the alternate method of communicating with the end user comprises a text message.

19. The method of claim 11 further comprising:
locating context information stored for the end user;
processing the profile for the end user to determine a subset of the context information that is authorized to be sent to the server for the web service; and
sending the subset of the context information to the server.

20. The method of claim 19 further comprising:
sending a query to the end user to determine the subset of the context information that is authorized to be sent to the server.

* * * * *